Dec. 11, 1962 R. L. HOLLOWAY ET AL 3,067,620
ACCELERATION TESTING APPARATUS
Filed Jan. 9, 1958 5 Sheets-Sheet 1

INVENTORS
ROBERT L. HOLLOWAY
ALEXANDER C. WALL
BY
D.C. Roylance
ATTORNEY

Dec. 11, 1962   R. L. HOLLOWAY ET AL   3,067,620
ACCELERATION TESTING APPARATUS
Filed Jan. 9, 1958   5 Sheets-Sheet 2
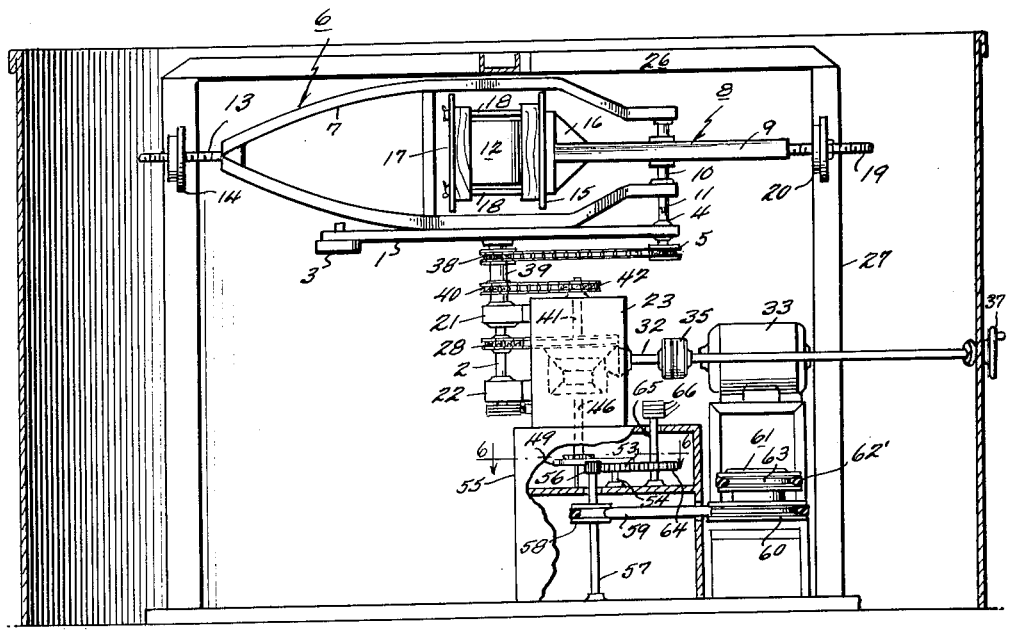
Fig. 3
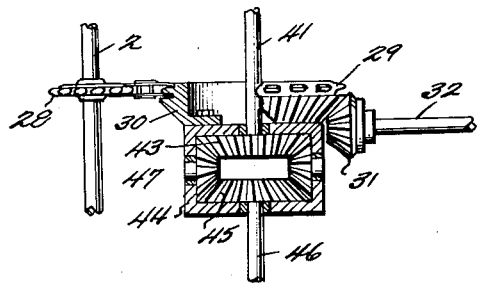
Fig. 5
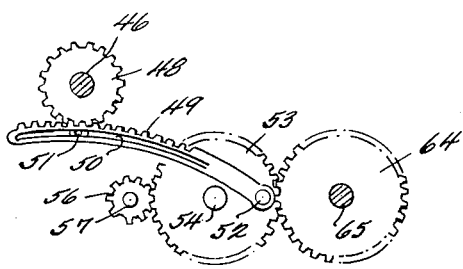
Fig. 6
INVENTORS
ROBERT L. HOLLOWAY
ALEXANDER C. WALL
BY 
ATTORNEY Dec. 11, 1962   R. L. HOLLOWAY ET AL   3,067,620
ACCELERATION TESTING APPARATUS
Filed Jan. 9, 1958   5 Sheets-Sheet 3

INVENTORS
ROBERT L. HOLLOWAY
ALEXANDER C. WALL
BY D. Roylance
ATTORNEY

Dec. 11, 1962   R. L. HOLLOWAY ET AL   3,067,620
ACCELERATION TESTING APPARATUS
Filed Jan. 9, 1958   5 Sheets-Sheet 4
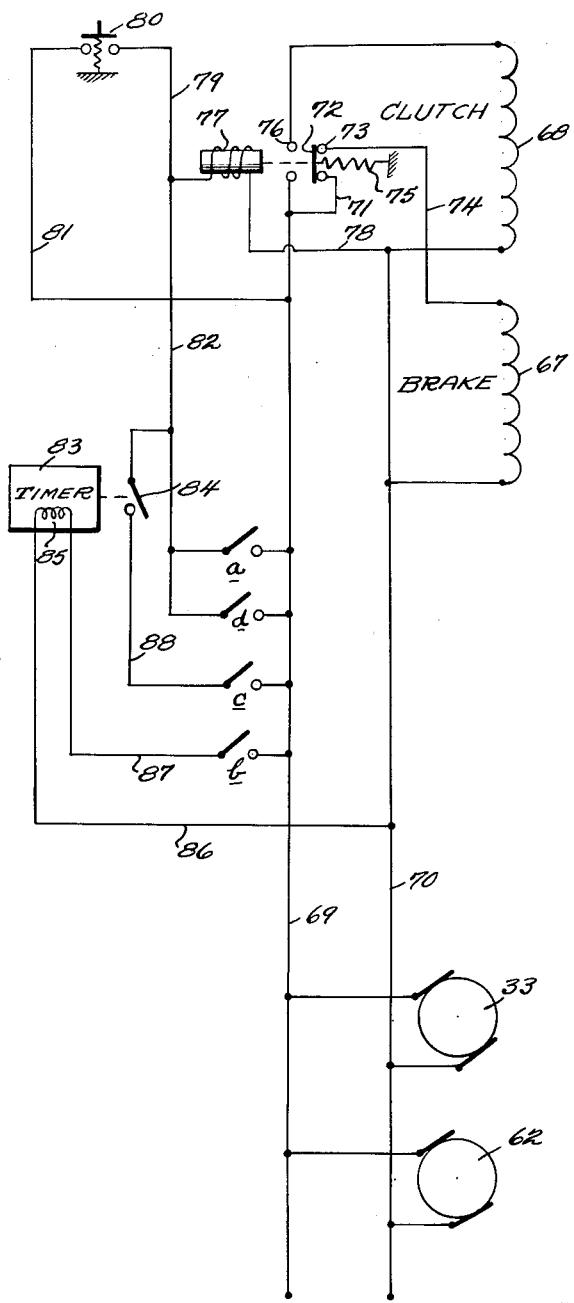
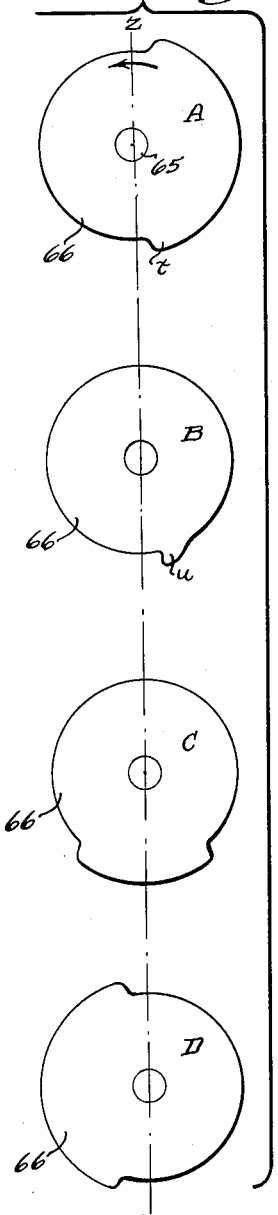
INVENTORS
*Robert L. Holloway*
*Alexander C. Wall*
BY
*O. C. Roylance*
ATTORNEY Dec. 11, 1962 R. L. HOLLOWAY ET AL 3,067,620
ACCELERATION TESTING APPARATUS
Filed Jan. 9, 1958 5 Sheets-Sheet 5

INVENTORS
ROBERT L. HOLLOWAY
ALEXANDER C. WALL
BY D.C.Roylance
ATTORNEY

United States Patent Office 3,067,620
Patented Dec. 11, 1962

3,067,620
ACCELERATION TESTING APPARATUS
Robert L. Holloway, Snyder, N.Y., and Alexander C. Wall, Darien, Conn., assignors to American Machine and Foundry Company, a corporation of New Jersey
Filed Jan. 9, 1958, Ser. No. 708,043
13 Claims. (Cl. 73—432)

This invention relates to an improved apparatus for acceleration testing of articles, devices, products, assemblies, etc., such, for example, as missile components, all hereinafter referred to generically as "test objects."

In the technical arts, it is common practice to test the ability of various articles or devices to withstand acceleration and deceleration forces by subjecting the same to predetermined, varying centrifugal forces. Ordinarily, this is accomplished simply by providing an arm rotatable about a fixed point, mounting the test object on said arm at a definite distance from such point, and bringing the arm up to a predetermined speed of rotation. For best results, it is desirable to obtain a "profile acceleration test," the test object being initially at zero, or near zero, speed, then accelerated to a predetermined maximum speed, and then decelerated to the initial speed.

In acceleration testers heretofore proposed, it has been the practice to bring the rotable arm from a condition of rest up to the desired predetermined speed of rotation quickly, within a very short time period, in order to produce the necessary rate of acceleration. This required the use of a relatively large driving force, suddenly applied, and the amount of energy or power absorbed during different stages of the cycle varied widely. To provide this large and variable force, an excessively heavy and expensive driving means was employed.

For example, in one form of prior apparatus, a pump was utilized to force motive fluid into a hydraulic accumulator, and when the requisite pressure had been built up, the fluid was instantaneously released into a turbine, which drove the rotatable arm. Subsequently, as the demand for energy diminished, massive braking was necessary.

It is accordingly a primary object of the present invention to provide a relatively low cost apparatus for acceleration testing of objects which is capable of carrying out a profile acceleration test without requiring an excessively large or variable driving force.

A further object is to devise apparatus of this character in which the amount of energy absorbed during the entire test cycle is substantially constant.

Another object of the invention is to provide apparatus for subjecting the test object to predetermined acceleration and deceleration forces without changing the speed at which the apparatus is driven.

Yet another object is to devise such an apparatus employing a rotary carriage upon which the test object is mounted first at or near the axis of rotation, then at a point radially displaced from the axis, and then again at the initial position, the carriage being rotated at a constant speed during such changes in the position of the test object.

A still further object of the invention is to devise instrumentation means by which, if the object being tested is of an electrical nature, as, for example, a battery, the effect of the acceleration upon it may be visually observed at all times while the test is taking place.

Other objects and advantages will appear as the description proceeds.

In order that the invention may be readily understood, reference is had to the accompanying drawings, which form a part of this specification, and wherein:

FIG. 1 is a side elevational view of the rotatable carriage and test object holder of an acceleration testing apparatus constructed in accordance with one embodiment of the invention;

FIG. 1ª is a view similar to FIG. 1, but with the test object holder shown in a different position;

FIG. 3 is a vertical elevational view, mainly diagrammatic, and with some parts broken away for clarity, of an acceleration testing apparatus embodying the mechanism of FIGS. 1–2;

FIG. 5 is a detail vertical sectional view on a larger scale than FIGS. 3 and 4, with some parts shown in elevation, of certain gear mechanisms employed in the illustrated embodiment of the invention;

FIG. 6 is a sectional plan view, on a similar scale, taken substantially on the line 6—6 of FIG. 3, showing other gear mechanism employed;

FIG. 7 is a diagram showing the electrical circuits for automatically controlling the operation of the apparatus;

FIG. 8 is a view, on an enlarged scale, showing the series of cams employed for operating the switches illustrated in FIG. 7;

Figure 1:
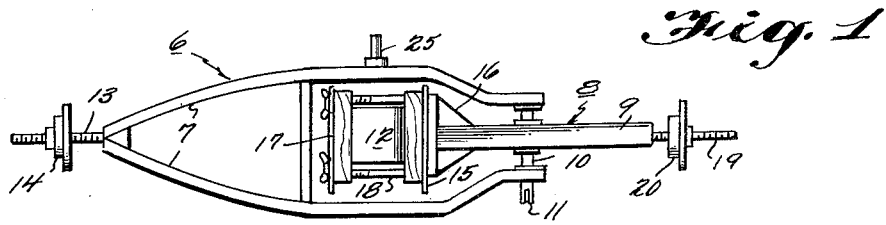
Figure 1A:
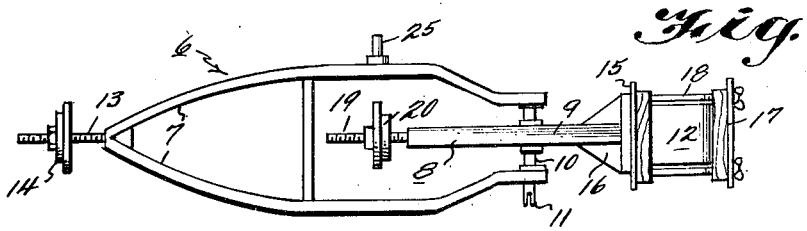

In general, the objects of the invention are attained by employing a rotary carriage or support driven at a predetermined constant speed by suitable drive means, and mounting the test object on the carriage in such fashion that, as the carriage rotates, the position of the test object may be shifted radially outwardly from the axis of rotation of the carriage, thereby causing the test object to be accelerated without requiring an increase in the speed of the carriage. Then, after a predetermined interval, the test object is returned to its original position, causing the test object to be decelerated, completing a profile acceleration test.

In the embodiment of the invention illustrated in FIGS. 1 to 9 of the drawings, a horizontal supporting bar 1 is rigidly secured to the upper end of a vertical driving shaft 2. This bar carries an adjustable counterweight 3 at one end, and at the other end is journaled a vertical stub shaft 4, to the lower end of which is fixed a sprocket wheel 5.

Removably mounted on the bar 1, as by means of pins and sockets (not shown) is the carriage or frame 6, comprising a pair of curved bars 7, lying in a common vertical plane. The test object holder or carrier 8 includes an arm 9 rigidly mounted on shaft 10 for rotation thereby, the shaft 10 being parallel to but spaced laterally from drive shaft 2.

The shaft 10 is in alignment with the stub shaft 4, and is positively connected therewith by means of a vertically detachable clutch or coupling 11. When the parts are assembled, as shown, the shaft 10 is driven by the stub shaft 4.

The bars 7 have parallel intermediate portions spaced apart sufficiently to allow the test object 12 to pass therebetween. At one end of the carriage, the bars 7 converge, their end portions being secured together, as by welding. An extension 13 is attached to the joined ends of the bars to provide means for adjustably mounting a counterweight 14. At the opposite end of the carriage, the bars 7 are spaced sufficiently to accommodate arm 9 of the test object carrier. Arm 9 is rigidly secured to shaft 10, and the shaft is journaled in the free end portions of bars 7.

At one end, arm 9 of carrier 8 is provided with test object holding or mounting means including a plate 15 extending transversely of the arm. The plate may be welded to the end of the arm, braces 16 being added for increased rigidity. The test object 12 is clamped between plate 15 and an opposing additional plate 17 by means of clamping bolts 18.

At its other end, arm 9 is provided with an extension 19 carrying a counterweight 20. Counterweight 20 is radially adjustable with respect to the axis of rotation of carrier 8, and this can be accomplished by having the counterweight threaded on extension 19. Counterweight 14 similarly can be threaded to extension 13 on carriage 6.

It will be understood that in a rapidly rotating system such as that described, it is of the utmost importance that the system be perfectly balanced, so as to prevent vibration. Owing to the fact that the carriage of frame 6 and arm 9 are readily removable, and can be lifted off of the bar 1 and shaft 2, this sub-assembly may be independently and accurately balanced by means of the adjustable counterweights 14 and 20. Then the bar 1, with its sprocket 5, may be balanced by means of the counterweight 3. Thus, when the frame and bar are assembled, the entire assembly will be balanced.

As seen in FIG. 3, drive shaft 2 is maintained in its vertical position by vertically spaced bearings 21, 22 mounted on housing 23. The upper one of bars 7 of carriage 6 has rigidly mounted thereon a stub shaft 24 (see FIG. 1). The stub shaft is in alignment with shaft 2, and is journaled in a bearing 25 carried by upper horizontal frame members 26, these members being welded or otherwise fixed to uprights 27.

Drive shaft 2 is driven continuously in one direction by rotary drive means comprising a driven sprocket 28, FIGS. 3 and 5, fixed to the drive shaft, a drive sprocket 29 made integral with gear 30, and a beveled pinion 31 meshed with gear 30 and mounted on shaft 32. Shaft 32 is rotated by electric motor 33 via drive pulley 34, FIG. 4, on the motor shaft, variable speed pulley 35 and pulley 36, the pulleys being connected by V-belts. The desired constant speed of rotation of drive shaft 2, and thus of carriage 1, is selected by adjusting variable pulley 35, by means of hand wheel 37. It will be understood that the variable pulley 35 may be of any suitable conventional type and is therefore illustrated only diagrammatically.

To attain the desired profile acceleration of test object 12 without requiring a corresponding variation in the speed of rotation of the carriage, it is necessary that carrier 8 be swung about its axis of rotation 10 while the carriage is rotating at high speed. In accordance with this embodiment of the invention, such swinging movement is advantageously accomplished by connecting sprocket 5 to a sprocket 38 fixed to a cylindrical bushing or sleeve 39 which is rotatably mounted on drive shaft 2 immediately below bar 1. Below sprocket 38, bushing 39 carries a second sprocket 40.

Spaced from drive shaft 2, and journaled in a suitable bearing on housing 23, is a shaft 41 carrying a sprocket 42. Suitable drive chains connect sprockets 5 and 38, and sprockets 40 and 42, all of which are shown as of the same size.

Shaft 41 is rigidly secured at its lower end to one gear 43 of a differential mechanism 44, the other gear 45 of which is carried at the end of a vertical power shaft 46, axially aligned with shaft 41. Pinions 47 are interposed between the two gears, and the gear 30 is secured to the housing of the differential mechanism 44.

The shaft 46 constitutes the output of an alternating-rotary driving mechanism including a pinion 48 secured to said shaft, which pinion meshes with an arcuate rack 49. This rack is formed with an arcuate slot, working over a fixed pin 51, which guides the rack and holds it in engagement with the pinion.

The rack 49 is pivoted at one end to a wrist pin 52 set in a gear 53, mounted on a vertical shaft 54, supported in a gear box 55.

A driving pinion 56 meshes with the gear 53, and is carried at the upper end of a vertical shaft 57. Secured to this shaft is a pulley 58, driven by a belt 59, running around a larger pulley 60, which constitutes the output of a special, automatic, electromagnetically controlled clutch and brake mechanism, designated in its entirety by the reference numeral 61. This mechanism is driven by electric motor 62, through belt 62' (see FIG. 4), and is so constructed that, with motor 62 running continuously, the clutch and brake can be automatically operated by means of a timer and cam-controlled switches to cause accurately predetermined partial rotations of the shaft 57 and hence of the gear 53.

By reference to FIG. 6, it will be observed, that, by virtue of the rack 49, the gear 48 and shaft 46 will be turned in one direction during rotation of gear 53 through one half revolution, and in the opposite direction during rotation of this gear through the other half revolution.

Meshing with gear 53 is another gear 64, secured to a shaft 65, extending up through the top wall of housing 55. Rigidly mounted on the upper end of this shaft are a series of four cams 66. The shape of these cams is shown in detail in FIG. 8.

When the shaft 46, and consequently the gear 45, is locked or held stationary by the clutch and brake mechanism hereinafter described, through the gearing shown in FIG. 6, and the gear 30 is driven by pinion 31, not only will shaft 2 be rotated, but shaft 41 will be driven through the differential gearing at a speed double that of gear 30. By properly selecting the ratios between sprockets 28 and 29, on the one hand, and sprockets 40 and 42 on the other, the bushing or sleeve 39 will be driven at the same speed as shaft 2. Hence as the arm 1 and carriage 6 gyrate about the axis of shaft 2, the sleeve 39 will turn with them, and the sprocket 5, although sweeping through a circular path, will be idle, and will not turn on its own axis. Thus the test object 12 will remain in one or the other of the positions shown in FIGS. 1 and 1ª, while the carriage rotates.

If, however, the clutch and brake mechanism is actuated to produce a partial rotation of shaft 46 and gear 45, as hereinafter explained, then this rotation will be superposed upon or added to the above described rotation of sleeve 39, and this superposed rotation will cause the speed of the sleeve to differ momentarily from that of shaft 2. As a result, the sleeve will turn on shaft 2, and the sprocket 38 will turn the sprocket 5 through a partial revolution, the same as if the arm 1 and carriage 6 were stationary. Sprocket 5 will turn shaft 10, and the test object carrier 8 will be suddenly swung around from the position shown in FIG. 1 or 1ª, to that shown in the other, as indicated by the broken line circle $x$ in FIG. 2. Thus we have provided mechanism for changing the angular position of the carrier 8 as desired, while the carriage 6 is continuously rotating at high speed.

The clutch and brake mechanism may be of the well-known type in which a driven member, such as pulley 60 in FIG. 3 is either held stationary by the brake, or coupled to a driving member, such as pulley 63, by the electromagnetically actuated clutch, the arrangement being that the brake is normally effective, and the clutch normally de-energized.

Referring to the diagram of FIG. 7, the actuating windings for the brake and clutch are indicated at 67 and 68 respectively. These are adapted to be energized by current from the leads 69 and 70. The lead 69 is connected by wire 71 with one of a pair of switch contacts 73, arranged to be bridged by a switch 72, the other contact being connected by wire 74 with one side of the brake winding 67. The other side of this winding is connected with lead 70. The switch 72 is biased, as by means of a spring 75, to a position bridging the contacts 73, as shown. Thus the brake winding is normally energized, and the pulley 60 locked or held stationary.

The switch 72 is also adapted to engage another pair of contacts 76, one of which is connected with lead 69, and the other of which is connected with one side of clutch winding 68. The other side of this winding is connected with lead 70. Thus, when the switch 72 is moved from the position shown, into engagement with contacts 76, the brake winding is de-energized and releases the pulley 60, and the clutch winding is simultaneously energized so as to couple pulley 60 with the driving pulley 63.

The switch 72 is moved by means of an electromagnet 77, controlled by a manual switch 80, of the push-button type, and supplied with current over a circuit including the wires 78, 79 and 81.

An electrically or mechanically driven timer 83 is provided, and includes a starting winding 85, supplied with current by the wires 86, 87. The timer is constructed to operate a switch 84. A set of four cam-actuated switches is also provided for automatically controlling the operation of the apparatus. A wire 82 is also connected with the winding of electromagnet 77, and switches $a$ and $d$ are interposed between this wire and lead 69. The timer switch 84 is connected with wire 82, and through wire 88 and lead 69, in series with cam-operated switch $c$. The fourth cam-operated switch $b$ controls the circuit 86, 87 of the timer starting winding 85.

In FIG. 8 we have illustrated the profiles of the four cams 66, above referred to as mounted on shaft 65 (see FIG. 3), these cams being designated individually by the characters A, B, C and . It will be understood that the cams A, B, C and D are arranged to mechanically operate the switches $a$, $b$, $c$ and $d$ respectively. It will be further understood that these switches are normally biased to open position and are closed and held closed as long as they ride on the high parts of the cams.

Operation of this embodiment is as follows: The test object is first properly mounted in the holder on carrier 8 and the carrier adjusted angularly about its axis until the test object occupies the position seen in FIG. 1, in which it is substantially centered on the axis of shaft 2. Handwheel 37 is then manually adjusted to select the desired speed of rotation of carriage 6. Motor 33 is then started, driving the carriage continuously in one direction at the selected speed.

Since test object 12 is centered on the axis of rotation of carriage 6, the test object is subjected to no, or substantially no, acceleration forces.

When it is desired to carry out a test cycle, the push button 80 (FIG. 7) is operated. This energizes electromagnet 77, which actuates switch 76, thus opening the circuit of brake winding 67 and energizing the clutch winding 68. The pulley 60 (FIG. 3) immediately begins to rotate, thus imparting an additional partial rotation to shafts 46 and 41, in a direction determined by the alternating-rotary mechanism shown in FIG. 6. This in turn, causes sprocket 5 and shaft 10 to begin to rotate and to angularly displace the test object carrier. At the same time, cam shaft 65 commences to turn in the direction indicated by the arrow in FIG. 8.

It will be understood that the switch-operating elements engaged by the cams are located just above the respective cams substantially on the center line $z$—$z$.

The high or raised pair of cam A extends through nearly, but not quite 180°. The operator will hold the push button 80 down during the brief interval required for the shoulder $s$ of the cam to move through the small angle between the position shown and the line $z$—$z$. When it reaches this line, it will engage and close switch $a$, thus taking over the control of electromagnet 77 from manual switch 80, and maintaining the circuit of this magnet closed while the cam makes approximately a half revolution. The high part of the cam terminates a little short of 180° at the shoulder $t$ to allow for coasting or drifting action, due to momentum. However, it will be observed that the length of the raised portion, plus a small angle at one end to allow for operation of the push button, and a small angle at the other end to allow for coast or drift, equals 180°.

Referring to FIGS. 3, 5 and 6, it may be explained that the sprockets 29 and 28 have a two-to-one ratio, and that the gears 53 and 64 have a one-to-one ratio. Also the gear 53, rack 49 and pinion 48 are so designed that a half revolution of the gear 53 will rotate shaft 46 through 180°. Furthermore, each pair of sprockets 40 and 42, and 38 and 5 have a one-to-one ratio. As a result, the rotation of cam A (FIG. 8) through 180°, as above described, produces rotation of the shafts 46 and 41 through the same angle, which partial rotation is imparted to sprocket 5 through sprockets 42, 40 and 38. This rotation causes test object carrier 8 to be angularly displaced through 180°, moving test object 12 to its outermost radial position, seen in FIG. 1ª. Since the radial spacing between the test object and the axis of rotation of the carriage is thus suddenly increased to a predetermined extent, the test object is subjected to a correspondingly rapid acceleration.

Figure 2:
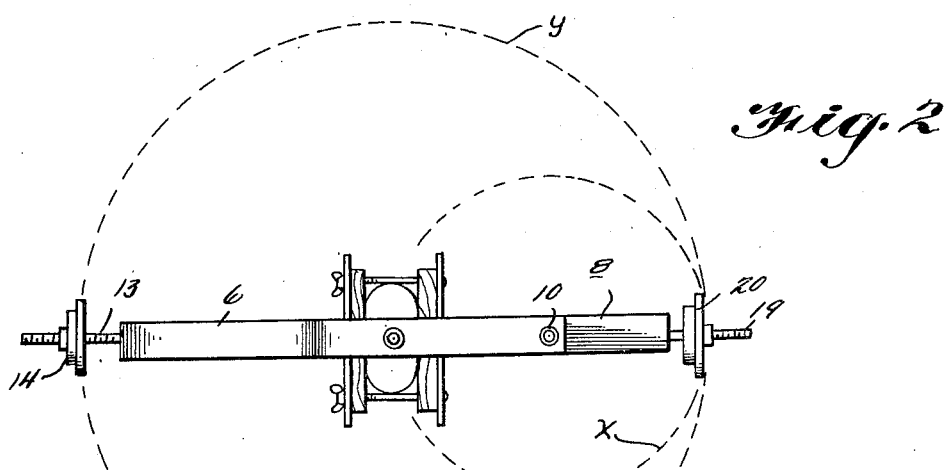
FIG. 2 is a plan view of the mechanism of FIGS. 1 and 1ª, rotational direction of the parts being shown by the dashed lines and arrows.
Figure 4:
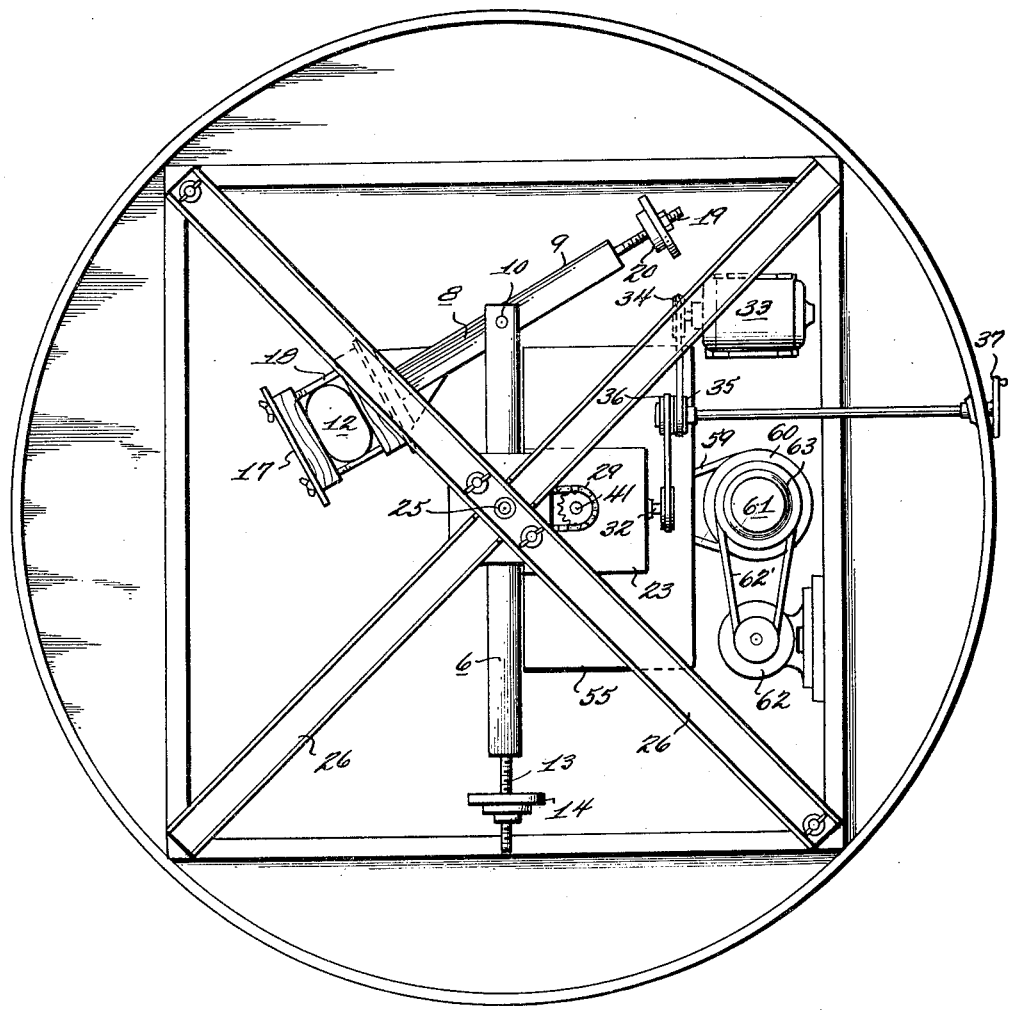
FIG. 4 is a plan view of the apparatus of FIG. 3.

Referring to FIG. 2, it will be noted that the direction of angular displacement of the test object carrier is indicated as opposite to the direction of rotation of the carriage. We have found such counter-rotation to be particularly advantageous, since it assures that the test object will be accelerated to a maximum speed when it reaches its radially outermost position. While the apparatus is entirely operable when the carrier is shifted by rotating it in the same direction as the carriage, it must be noted that such co-rotation causes the test object to be accelerated through a range of speeds greater than the speed with which the test object travels after it has been shifted to its outermost position. Adjustment of the carrier by rotation in the opposite direction from the carriage is advantageous, in other words, because it allows the speed of the test object in its outermost position to be chosen as the maximum speed for the profile acceleration test.

It will therefore be understood that, the alternating-rotary mechanism shown in FIG. 6 should be so adjusted that, during the first stage of the test cycle, the shaft 46 rotates in such a direction as to rotate the test object carrier in a direction opposite that in which the carriage is turning, as indicated by the broken semi-circle $x$ and arrow in FIG. 2. The gear 53 (FIG. 6) is moved through only one half revolution to complete the above mentioned first phase of the test cycle.

When the switch $a$ rides off of the high part of cam A and opens, the electromagnet 77 is de-energized, thus disconnecting the clutch and applying the brake again to the driven parts. Thereafter, the carriage 6 continues to gyrate with the test object 12 in its outermost position, thereby subjecting the test object to a strong centrifugal force.

By reference again to FIG. 8, it will be observed that at the instant the switch $a$ drops off of the cam A and is opened, a lug $u$ on cam B engages and closes switch $b$, thus momentarily energizing the starting winding 85 of timer 83. This trips the timer and it begins to run. It will continue to run for the interval for which it has been set, thus measuring the selected period of time during which the test object is subjected to centrifugal force.

Meanwhile cam C has closed and held closed the switch $c$, which is in series with timer switch 84.

At the end of the interval for which the timer has been set, the switch 84 closes, thus re-energizing electromagnet 77 and releasing the brake and activating the clutch. Cam C thereupon allows switch $c$ to open, and immediately thereafter, the cam D takes over, closing switch $d$ and thus maintaining electromagnet 77 energized for a sufficient time to permit the carrying out of the last or decelerating stage of the test cycle. The cam D has a raised portion extending through not quite 180°, the same as cam A, being slightly shortened at each end for the same reason.

It will be understood that during this last stage of the test cycle the test object carrier is swung back to its original position on the carriage, thus subjecting the test object to rapid deceleration. It will be further understood that during this last stage, the gear 53 makes another half revolution, thus causing a reverse rotation of shaft 46. This causes the carrier 8 to move the test object back along the same semicircular path $x$ over which it traveled during the first stage, in a direction opposite the arrow, that is to say, in the same direction as that in which the carriage is rotating. This, however, is not particularly important, since, during this last stage, the test object is being subjected to deceleration.

Figure 10:
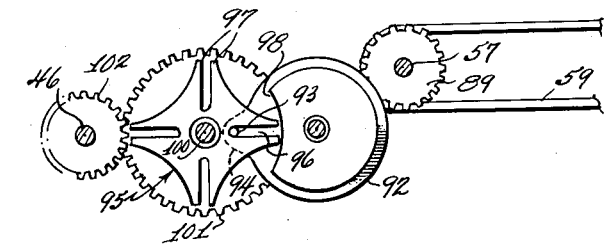
FIG. 10 is a plan view of modified gear mechanism adapted for use in place of that illustrated in FIG. 6.
Figure 11:
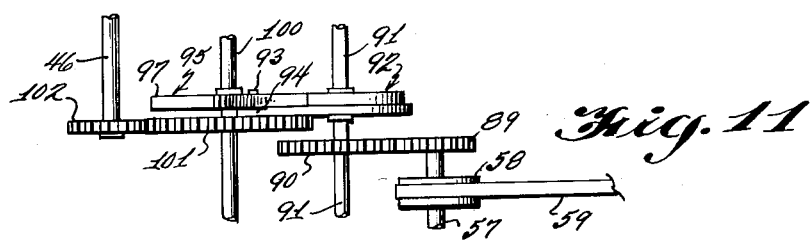
FIG. 11 is a side elevation of the gear mechanism shown in FIG. 10.

In order to swing the test object carrier arm in a direction opposite the direction of rotation of the carriage during both the first and last stages of the test cycle, I may advantageously employ the Geneva gear shown in FIGS. 10 and 11, in place of the alternating-rotary mechanism shown in FIG. 6.

In this Geneva gear, the shaft 57 (corresponding with the similarly numbered shaft in FIG. 3) carries a pinion 89, meshing with a gear 90, fixed on a shaft 91, on which is also mounted the driving member 92 of the Geneva gear. This member has an offset lug 94 which carries a pin 93 working freely in the radial slots 96 of the driven member 95. These slots are formed between pairs of fingers 97, and a recess 98 is provided in the driving member to accommodate these fingers, as shown in the drawing. The periphery of the member 95, between one finger of each pair, is cut on an arc of the same radius as the driving member, so that these arcs are adapted to embrace the periphery of the driving member, to lock the driven member against movement between successive steps, in a well-known manner.

The driven member 95 is fixed to a shaft 100, on which shaft is also mounted a gear 101. This gear meshes with a gear 102, fixed to what corresponds with shaft 46 in FIG. 3. The gears 101 and 102 have a two-to-one ratio, and the driven member 95 has four slots, as shown, spaced 90° apart. Thus, when, at each step, the driven member turns through 90°, the shaft 46 is turned through 180°.

Instead of utilizing a separate cam-shaft, as in FIG. 3, the cams shown in FIG. 8 are mounted on the shaft 46 of FIG. 10. When, therefore, the starting button 80 of FIG. 7 is pressed, and the cam A starts, and then takes over, the Geneva gear, above described, will be actuated through 90°, and the shaft 46 through 180° before the clutch is released. This rotation of shaft 46 not only controls the cams, but also serves to swing the test object carrier through 180°, as already described in connection with FIGS. 3, 5 and 6.

There is, however, this fundamental difference between the functioning of this Geneva gear and the mechanism shown in FIG. 6, namely, that each successive actuation of the Geneva gear drives the shaft 46 always in the same direction. Thus, during the last stage of the test cycle, when the cam D is in control, the test object is returned to its starting point over the upper half of the circular path, as viewed in FIG. 2, and in the direction of the arrow. Thus, during deceleration, the test object is rotated in a direction opposite to that of the carriage, the same as during the acceleration thereof.

Another advantage of the Geneva gear arrangement is the fact that, after each step, it serves to lock the shaft 46, by reason of the engagement of arcuate surfaces 99 with the circumference of member 92, and thus hold gear 45 of the differential mechanism stationary quite independently of the action of the brake, previously relied upon for performing this function.

In case the test object is a piece of electrical apparatus, such, for example, as a battery, it is desirable to determine the effect of acceleration and centrifugal force on the apparatus during the time the test is being carried out. In other words, it is desirable to connect instruments to the battery so as to be able to continuously observe its output as the test progresses through its several stages.

Figure 9:
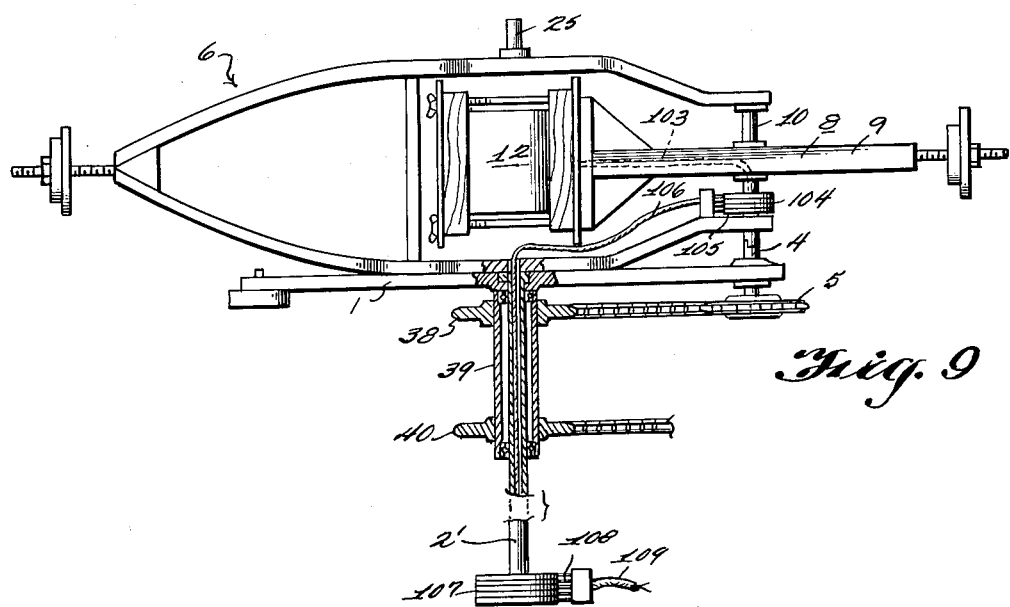
FIG. 9 is an elevational view, similar to FIG. 1, but on a larger scale, showing means for establishing electrical connections with the test object, parts being in section.

To this end we provide equipment such as illustrated in FIG. 9. Referring to this figure, it will be seen that we run a cable 103, comprising the requisite number of conductors, through the arm 9, and connect one end of these conductors to the terminals of the battery or other apparatus 12. The other ends of these conductors are connected to slip rings 104, mounted on the shaft 10. Brushes 105 bear upon these slip rings, and from the brushes extends a cable 106 down through a hollow driving shaft 2'. The conductors in this cable are connected with slip rings 107 on the lower part of the shaft, and these slip rings bear brushes 108, connected with a cable 109. The conductors in this cable may be connected with suitable instruments such as ammeters and voltmeters, which will continuously indicate the condition of the apparatus as the test proceeds.

While the apparatus illustrated represents advantageous embodiments of the invention, it will be recognized by those skilled in the art that the invention may take other forms without departing from the scope of the appended claims. Thus, while it is advantageous to have the test object carrier so constructed and mounted that the innermost position of the test object is centered on drive shaft 2, with initial acceleration of the test object thus being negligible or zero, such arrangement is not essential. It is only necessary that the test object be shifted between two positions differently spaced radially from the axis of rotation of the carriage. While, in the embodiment illustrated in FIGS. 1 to 3, rotation of the test object carrier takes place about a vertical axis, it will be understood that such axis can also be horizontally disposed.

What is claimed is:

1. In a centrifuge, the combination of a rotary carriage, drive means operatively connected to said carriage to rotate the same continuously, an object carrier movably mounted on said carriage for rotation about an axis spaced laterally from the axis of rotation of said carriage and including object holding means movable from a position such that an object held thereby is substantially centered on the axis of rotation of said carriage to a second position spaced radially from said axis, and cyclically operable rotary drive mechanism connected to said carrier for actuating the same, during rotation of said carriage by said drive means, to move said holding means in steps of 180° from said first position to said second position, whereby the object held by said holding means is accelerated, and then from said second position, back to said first position whereby the object is decelerated.

2. The apparatus of claim 1, wherein said carrier is mounted for rotation about an axis displaced laterally from the axis of rotation of said carriage, and said cyclically operable means is a rotary drive mechanism constructed to move said object carrier in steps of 180°.

3. In an apparatus for acceleration testing of objects, the combination of a carriage rotatable about a vertical first axis, a test object carrier, means supporting said carrier on said carriage for rotational movement about a second axis laterally displaced from said first axis, said carrier including test object mounting means spaced laterally from said second axis, drive means operatively connected to said carriage to continuously rotate the same about said first axis, and means operatively connected to said carrier to angularly adjust the same about said second axis when said carriage is rotating to effect and maintain a predetermined radial spacing between said first axis and said test object mounting means.

4. In an apparatus for acceleration testing of objects, the combination of a carriage comprising a pair of spaced frame members, a test object carrier mounted for rotary movement about a vertical first axis extending transversely across said frame members and lying in the plane thereof, means mounting said carriage for rotation about a second axis parallel to and spaced from said first axis, drive means operatively connected to said carriage to continuously rotate the same, and means operatively connected to said carrier to adust the same angularly about said first axis while said carriage is rotated by said drive means.

5. The apparatus of claim 4, wherein said test object carrier comprises test object mounting means spaced from said first axis by a distance such that the test object, when mounted thereon, will cross said second axis during rotative movement of said carrier about said first axis.

6. In an apparatus for acceleration testing of objects, the combination of support means, a vertical drive shaft journaled in said support means, a rotary carriage connected to said drive shaft for rotation thereby, a test object carrier mounted on said carriage for additional movement about an axis spaced from and parallel to said drive shaft, power means operatively connected to said drive shaft to rotate the same, and rotary adjusting means operatively connected to said test object carrier to adjust the carrier angularly about said axis while said carriage is rotated by said drive shaft, said adjusting means comprising an element mounted for free rotation on said drive shaft, means for rotating said element to a predetermined extent, and means for transferring such rotation of said element to said test object carrier.

7. An apparatus in accordance with claim 6, wherein said element is a bushing freely rotatable with respect to said drive shaft, said bushing having two rotary members rigidly attached thereto, one such member being operatively connected to said test object carrier, and said adjusting means further comprising rotary drive means connected to the other such rotary member to rotate said bushing on said drive shaft through a predetermined angle.

8. In an apparatus for acceleration testing of objects, the combination, with a rotary carriage, of an elongated test object carrier mounted for rotation about a transverse axis displaced laterally from the axis of rotation of said carriage, said carrier including test object mounting means located a substantial radial distance from said transverse axis, whereby swinging said carrier on such axis serves to change the radial distance of said object mounting means from the axis of rotation of said carriage, means for swinging said carrier about its axis through 180° in one direction, thereby moving said object mounting means along a semi-circular path to increase its distance from the axis of rotation of said carriage, and means for subsequently swinging said carrier through 180° in the opposite direction, thereby moving said test object mounting means back along the same semi-circular path to its initial position.

9. In an apparatus for acceleration testing of objects, the combination, with a rotary carriage, of an elongated test object carrier mounted for rotation about a transverse axis displaced laterally from the axis of rotation of said carriage, said carrier including test object mounting means located a substantial radial distance from said transverse axis, whereby swinging said carrier on such axis serves to change the radial distance of said object mounting means from the axis of rotation of said carriage, means for swinging said carrier about its axis through 180° in one direction, thereby moving said object mounting means along a semi-circular path to increase its distance from the axis of rotation of said carriage, and means for subsequently swinging said carrier through another 180° in the same direction, thereby moving said object mounting means along an additional semi-circular path to its initial position.

10. In an apparatus for acceleration testing of objects, the combination of frame means, an upright drive shaft journaled in said frame means, a rotary carriage connected to said drive shaft for rotation thereby, a test object carrier mounted on said carriage for rotational movement about an axis spaced from and parallel to said drive shaft, power means operatively connected to said drive shaft to rotate the same, and rotary adjusting means operatively connected to said test object carrier to adjust the carrier angularly about said axis while said carriage is rotated by said drive shaft, said adjusting means comprising an element mounted for free rotation on said drive shaft, means for normally rotating said element at the same speed as said drive shaft, means for superposing on such normal rotation of said element, when desired, an additional rotation through a predetermined angle relative to said drive shaft, and means for transferring such additional rotation of said element to said test object carrier.

11. Apparatus in accordance with claim 10 in which the means for superposing the additional rotation on said element includes a differential gearing through which said element is driven.

12. In a centrifuge, the combination of first means rotatable about a first axis, second means mounted on said first means for rotation relative thereto about a second axis spaced laterally from said first axis, an object holder carried by said second means for holding an object in a position spaced from said second axis, drive means operably connected for continuously rotating said first means at a predetermined rate, and adjusting means connected to said second means for rotating the same about said second axis, when said first means is rotating, to change the radial distance between such object and said first axis and thereby alter the centrifugal force acting on such object.

13. In an apparatus for acceleration testing of objects, the combination of a carriage rotatable about a vertical first axis, a test object carrier, means supporting said carrier on said carriage for rotational movement about a second axis parallel to and linearly displaced from said first axis, said carrier including test object mounting means spaced linearly from said second axis a distance substantially equal to the distance between said first and second axes, drive means operatively connected to said carriage to continuously rotate the same about said first axis, and means operatively connected to said carrier to angularly adjust the same about said second axis when said carriage is rotating to effect a predetermined radial spacing between said first axis and said test object mounting means.

References Cited in the file of this patent

UNITED STATES PATENTS

| | | |
|---|---|---|
| 443,645 | Copeland | Dec. 30, 1890 |
| 1,400,857 | Bloom | Dec. 20, 1921 |
| 1,829,311 | Tea | Oct. 27, 1931 |
| 2,301,967 | Nosker | Nov. 17, 1942 |
| 2,325,019 | Rubissow | July 20, 1943 |
| 2,465,437 | Englehardt | Mar. 29, 1949 |
| 2,788,654 | Wiancko et al. | Apr. 6, 1957 |
| 2,924,092 | Bourns et al. | Feb. 9, 1960 |